United States Patent [19]

Kanada et al.

[11] Patent Number: 4,546,933
[45] Date of Patent: Oct. 15, 1985

[54] WEBBING RETRACTOR

[75] Inventors: Shigeyasu Kanada; Shigeo Mizuno; Yoshio Nakano; Yuji Nishimura, all of Aichi, Japan

[73] Assignee: Kabushiki Kaisha Tokai-Rika-Denki-Seisakusho, Aichi, Japan

[21] Appl. No.: 670,358

[22] Filed: Nov. 9, 1984

[30] Foreign Application Priority Data

Nov. 11, 1983 [JP] Japan .................... 58-174657[U]

[51] Int. Cl.⁴ .................. A62B 35/00; B65H 75/48
[52] U.S. Cl. ........................... 242/107; 242/107.4 R
[58] Field of Search .......... 242/107, 107.4 R–107.4 E; 280/803, 806–807; 297/475–478

[56] References Cited

U.S. PATENT DOCUMENTS 4,002,219 1/1977 Steinmann ...................... 242/107
4,487,381 12/1984 Kubota .................. 242/107.4 R X

FOREIGN PATENT DOCUMENTS 2742676 4/1979 Fed. Rep. of Germany ... 242/107.4 R
3149573 6/1983 Fed. Rep. of Germany ... 242/107.4 R Primary Examiner—John M. Jillions
Attorney, Agent, or Firm—Koda and Androlia

[57] ABSTRACT

A webbing retractor is provided with a first variable resistor detecting a moving amount of an inner end of a spiral spring biasing a webbing takeup shaft in a direction of webbing winding, a second variable resistor detecting a moving amount of an outer end of the spiral spring and a drive control unit controlling a motor to move the outer end of the spiral spring in the direction of webbing winding or in a direction of webbing unwinding in response to signals outputted from the first and the second variable resistors. Accordingly, a tension of a webbing can be made comfortable for an occupant of a vehicle.

20 Claims, 9 Drawing Figures

4,546,933

WEBBING RETRACTOR

BACKGROUND OF THE INVENTION

1. Field of the Invention

The present invention relates to a webbing retractor adapted for use in a seatbelt system of a vehicle.

2. Description of the Prior Art

Such a conventional webbing retractor is so constructed that one end portion of a resilient member is connected to a takeup shaft for winding an occupant restraining webbing thereon whereby the takeup shaft is always biased in a direction of a webbing winding, or retraction, so that the webbing is caused to contact closely with an occupant of the vehicle at a time of a webbing use and it is automatically wound up on the takeup shaft after the webbing is used.

Thus, the resilient member has such a large biasing force that the webbing is completely retracted, or wound, in the webbing retractor after the webbing is used. In the conventional webbing retractor, accordingly, there is such a problem that it is difficult to make the biasing force proper at the time of the webbing use.

SUMMARY OF THE INVENTION

In view of the above problem, the present invention has as its object the provision of a webbing retractor capable of retracting the occupant restraining webbing therein completely, in which the biasing force of the resilient member is adjustable to a proper value when the webbing is applied to an occupant of the vehicle.

The webbing retractor according to the present invention is provided with a first moving amount detector for detecting a moving amount of one end portion of a resilient member, a second moving amount detector for detecting a moving amount of the other end portion thereof and drive control means controlling an actuator to move the other end of the resilient member in directions of webbing winding and webbing unwinding in response to signals outputted from the first and the second moving amount detectors.

Accordingly, a tension of the webbing can be made so proper that when the webbing is worn by the occupant the tension is kept low, thereby putting the occupant in a comfortable situation, and when the webbing is stored in the webbing retractor the tension is made almost zero, thereby make it easy to unwind the webbing from the webbing retractor.

Description will hereinunder be given of an embodiment of the invention with reference to the attached drawings.

EMBODIMENT OF THE INVENTION

Figure 1:
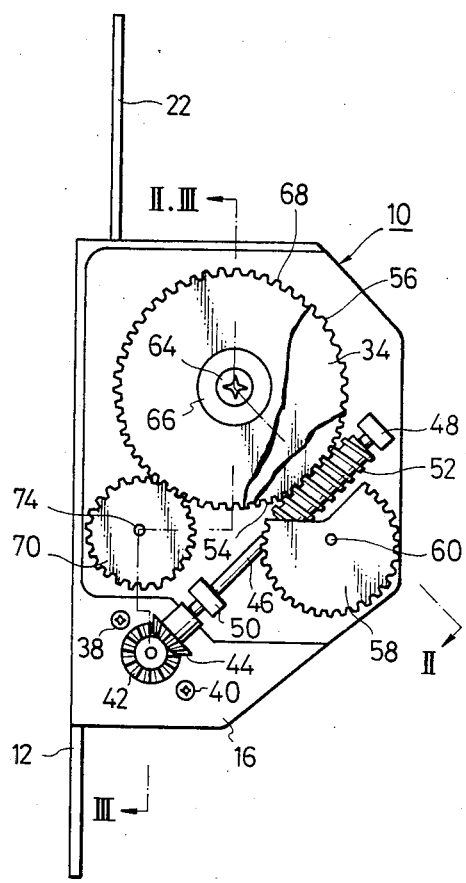
FIG. 1 is a side view of an embodiment according to the present invention.
Figure 2:
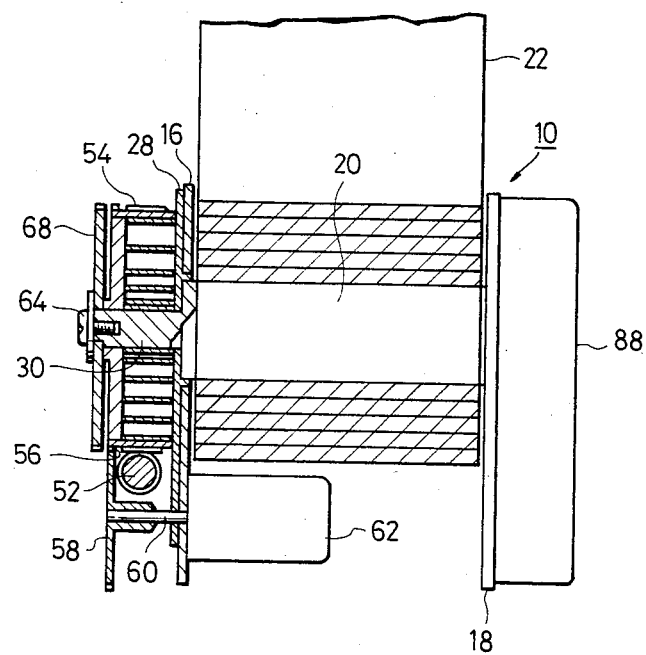
FIG. 2 is a sectional view of the embodiment taken along the line II—II of FIG. 1.

As shown in FIGS. 1 and 2, a webbing retractor 10 according to the present invention is formed at its frame 12 with a hole 14 for receiving a mounting bolt (not shown), and the frame 12 is fixed to a vehicle body (not shown) through the hole 14 and the mounting bolt.

Figure 4:
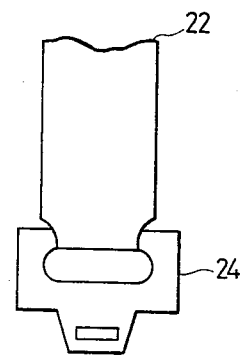
FIG. 4 is an explanatory view of a buckle device applied to the embodiment.
Figure 4:
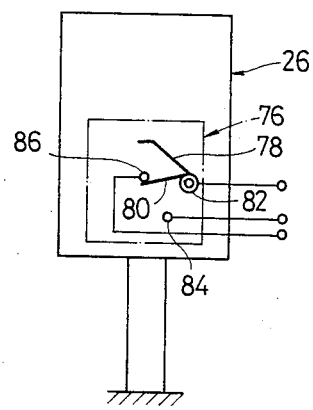

Extended from both side portions of the frame 12 are a pair of leg plates 16 and 18 in parallel with each other, which support a webbing takeup shaft 20 rotatably at both its end portions. The takeup shaft 20 is secured with one end portion of an occupant restraining webbing 22, the other end portion thereof being secured with a tongue plate 24, as shown in FIG. 4.

The tongue plate 24 can be latched to a buckle device 26 mounted on a floor panel of the vehicle body, so that an occupant can wear an intermediate portion of the webbing 22.

The takeup shaft 20 is provided at its one end positioned on the side of the leg plate 16 with a smaller diameter portion 30 which is extended through a sheet 28 disposed on the outside of the leg plate 16 and which is secured with an inner end of a spiral spring 32. The spiral spring 32 functions as a resilient member for biasing the takeup shaft 20 in a direction of a webbing retraction, or winding.

Also, supported rotatably to the smaller diameter portion 30 is a cylindrical spring case 34 to which an outer end of the spiral spring 32 is secured.

The webbing retractor 10 is provided with a motor 36 for moving the outer end of the spiral spring 32 in directions of webbing winding and webbing unwinding. In this embodiment the motor 36 is disposed between the leg plates 16 and 18.

The motor 36 is fixed to an inside face of the leg plate 16 by screws 38 and 40, and a drive shaft of the motor 36 is extended through the leg plate 16. The distal end portion of the drive shaft is fixed with a bevel gear 42 engaged with another bevel gear 44. The bevel gear 44 is fixed to one end portion of a shaft 46 rotatably supported by a pair of supporting members 48 and 50 mounted on the leg plate 16 through the sheet 28 and the shaft 46 is fixed at an intermediate portion thereof with a worm 52.

The worm 52 is engaged with a worm wheel 54 provided on an outer periphery of the spring case 34. Accordingly, a driving force of the motor 36 is transmitted to the outer end of the spiral spring 32 through the bevel gears 42 and 44, the shaft 46, the worm 52, the worm wheel 54 and the spring case 34, whereby the outer end of the spiral spring 32 can be moved in directions of webbing winding and webbing unwinding by rotations of the drive shaft in one direction and in the other direction. Thus, the motor 36, the worm gear and the spring case 34 constitute an actuator.

In addition, the webbing retractor 10 is provided with a first moving amount detector for detecting a moving amount of the inner end of the spiral spring 32 and a second moving amount detector for detecting a moving amount of the outer end thereof. These detectors are constructed as follows:

Provided on an outer periphery of the spring case 34 in parallel with the worm wheel 54 is a spur gear wheel 56 engaged with another spur gear wheel 58. The gear wheel 58 is fixed to a distal end of a shaft 60 of a variable resistor 62, the variable resistor 62 being mounted on the leg plate 16 and the shaft 60 being extended through the leg plate 16 and the sheet 28. Accordingly, a resistance value of the variable resistor 62 is changed in accordance with a moving amount of the outer end of the spiral spring 32, so that the variable resistor 62 can function to detect the moving amount thereof as the second moving amount detector.

Also, fixed to a distal end portion of the smaller diameter portion 30 is a spur gear wheel 68 by a screw 64. The spur gear wheel 68 is engaged with another spur gear wheel 70 fixed to a distal, end of a shaft 74 of a variable resistor 72, the variable resistor 72 being mounted on the leg plate 16 and the shaft 74 being extended through the leg plate 16 and the sheet 28 in the same manner as the above. Accordingly, a resistance value of the variable resistor 72 is changed in accordance with a moving amount of the inner end of the spiral spring 32, so that the variable resistor 72 can function to detect the moving amount thereof as the first moving amount detector.

The buckle device 26 is further provided with a detector for detecting a latching situation of the tongue plate 24 to the buckle device 26, as shown in FIG. 4. The detector comprises a buckle switch 76 provided with a movable contact 80 moved by a lever 78 operated by the tongue plate 24 capable of being received in the buckle device 26 and a contact 82 connected to the movable contact 80.

The movable contact 80 is connected to a fixed contact 84 when the tongue plate 24 is received in the buckle device 26, and it is connected to another fixed contact 86 when the tongue plate 24 is released from the buckle device 26.

Figure 3:
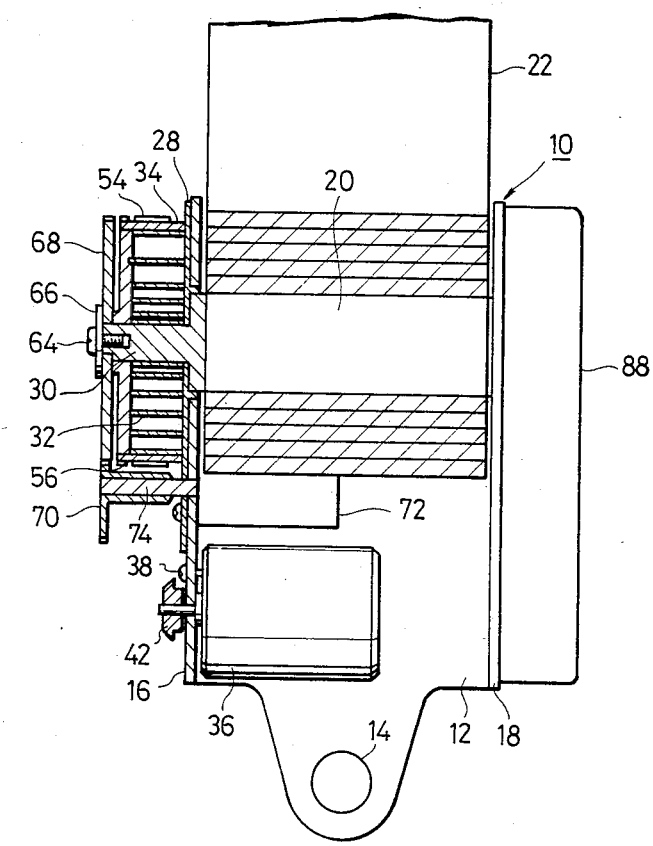
FIG. 3 is a sectional view of the embodiment taken along the line III—III of FIG. 1.

As shown in FIGS. 2 and 3, disposed on the outside of the leg plate 18 between the same and the takeup shaft 20 is an inertia locking mechanism 88 of an ordinary type, whereby when an abnormal acceleration of the vehicle or an abnormal acceleration of the webbing unwinding is detected. For example in an emergency situation of the vehicle, the takeup shaft 20 can immediately be prevented from its rotation in the direction of webbing unwinding.

In addition, the webbing retractor is equipped with a drive control means for controlling the motor 36 to drive the outer end of the spiral spring 32 through the spring case 34 to a position where a difference between the moving amount of the inner end of the spiral spring 32 and the moving amount of the outer end thereof detected, respectively, by the first moving amount detector and the second moving amount detector when the webbing is worn on the occupant corresponds to a predetermined value. The drive control means includes a drive control circuit 90, as shown in FIG. 5.

Figure 5:
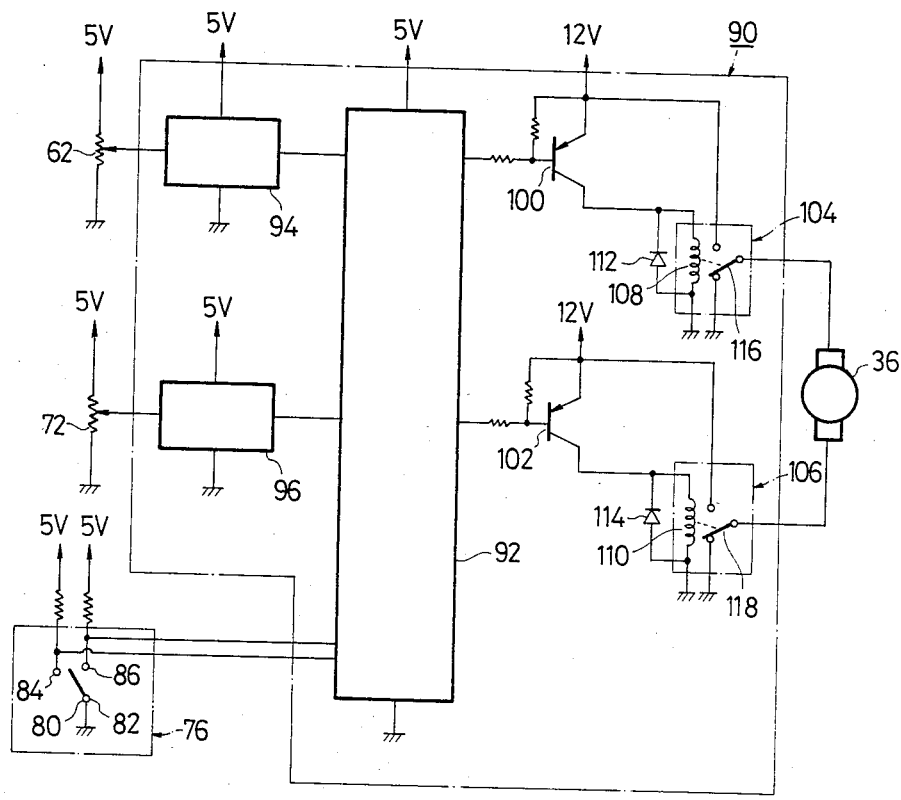
FIG. 5 is a circuit diagram of the embodiment.

In FIG. 5, a power source of 5 V is impressed directly to the variable resistors 62 and 72 and also it is impressed to the fixed contacts 84 and 86 through resistors. The output voltages of the variable resistors 62 and 72 and the fixed contacts 84 and 86 are respectively supplied to the drive control circuit 90.

The drive control circuit 90 includes a microcomputer 92 to which the output voltages of the variable resistor 62 and the variable resistor 72 are supplied respectively through an A/D converter 94 and an A/D converter 96 and to which the output voltages of the fixed contacts 84 and 86 are supplied directly. The power source of 5 V is also impressed to the microcomputer 92 and the A/D converters 94 and 96. Subjected to ON or OFF control by the microcomputer 90 are switching transistors 100 and 102, output currents of correctors of which are respectively supplied to magnetic coils 108 and 110 of relays 104 and 106. Connected to the magnetic coils 108 and 110 are feedback diodes 112 and 114, respectively. Also, a power source of 12 V is impressed to the switching transistors 100 and 102 and the relays 104 and 106.

In the relay 104 the coil 108 is excited by the switching transistor 100 so that a movable contact 116 is connected to the power source of 12 V or the ground, and in the relay 104 the coil 110 is excited by the switching transistor 102 so that a movable contact 118 is connected to the power source of 12 V or the ground. As a result, a positive or a negative current is supplied to the motor 36 whereby the motor 36 is driven rotatably in a positive or a negative direction.

For example, when the output voltage of the microcomputer 92 supplied to the base of the switching transistor 100 is changed to "L", the switching transistor 100 is switched on and the magnetic coil 108 is excited whereby the movable contact 116 is connected to the power source of 12 V so that the motor 36 is driven in the positive direction. On the other hand, when an output voltage "L" of the microcomputer 92 is suppled to the switching transistor 102, the movable contact 118 is connected to the power source of 12 V so that the motor 36 is driven in the negative direction.

Description will now be given of the operation of the webbing retractor 10 constructed in the above manner.

FIGS. 6 to 9 show steps of procedure in the drive control circuit 90.

Figure 6:
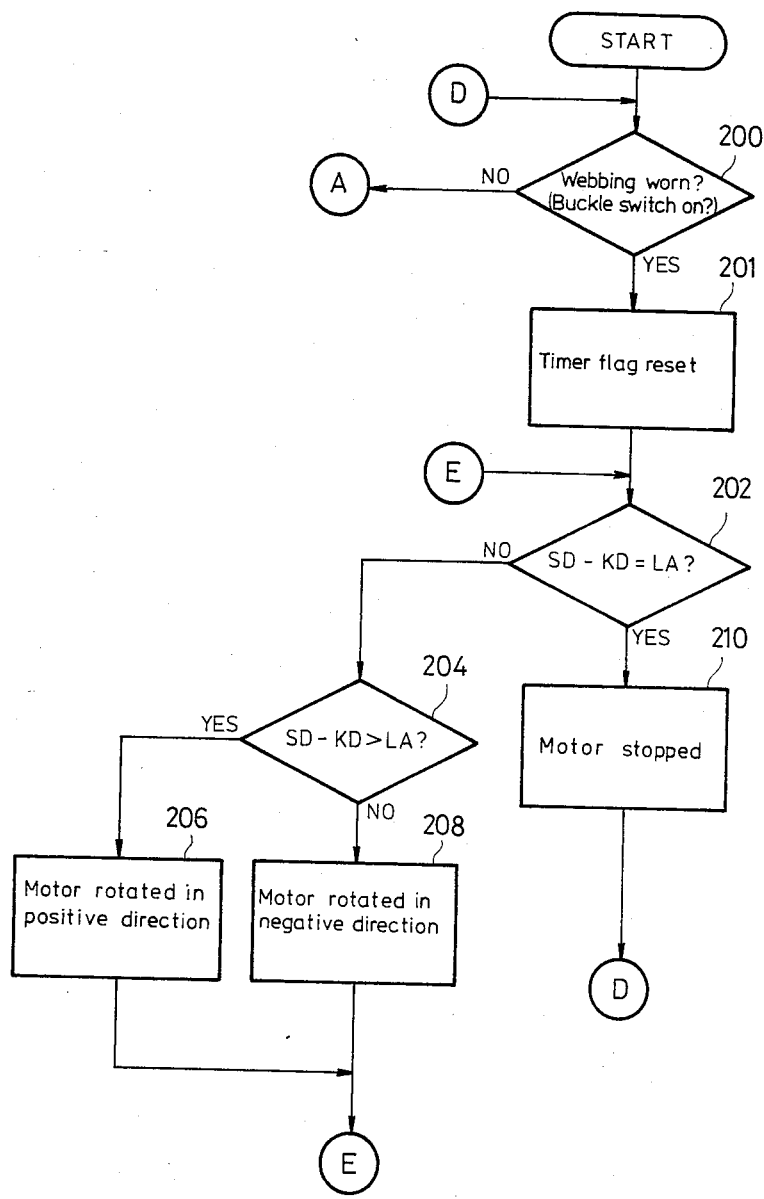
FIGS. 6 to 9 are flow charts showing procedure of drive control device of the embodiment.
Figure 7:
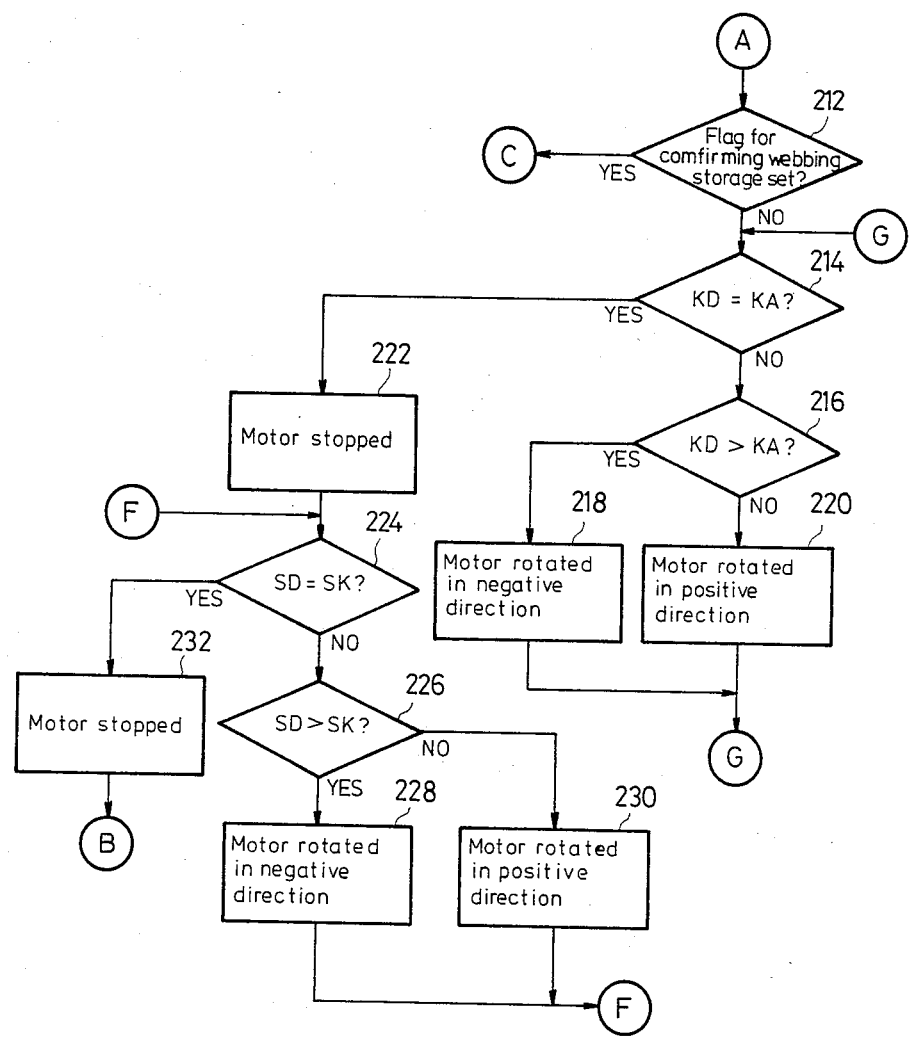
Figure 8:
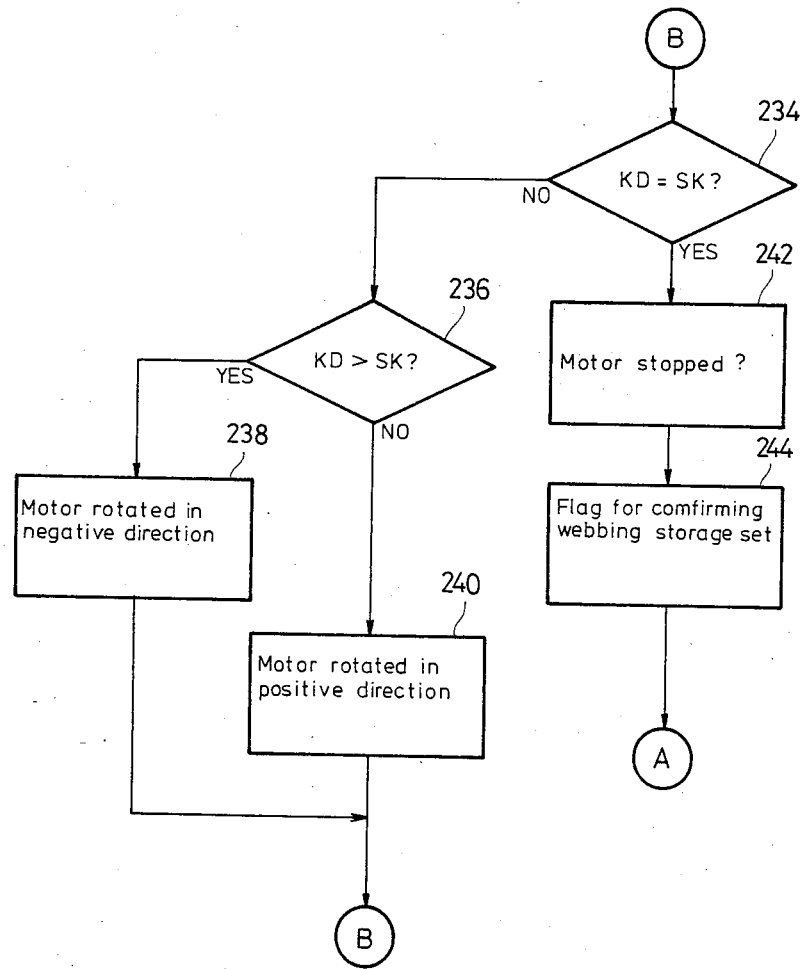
Figure 9:
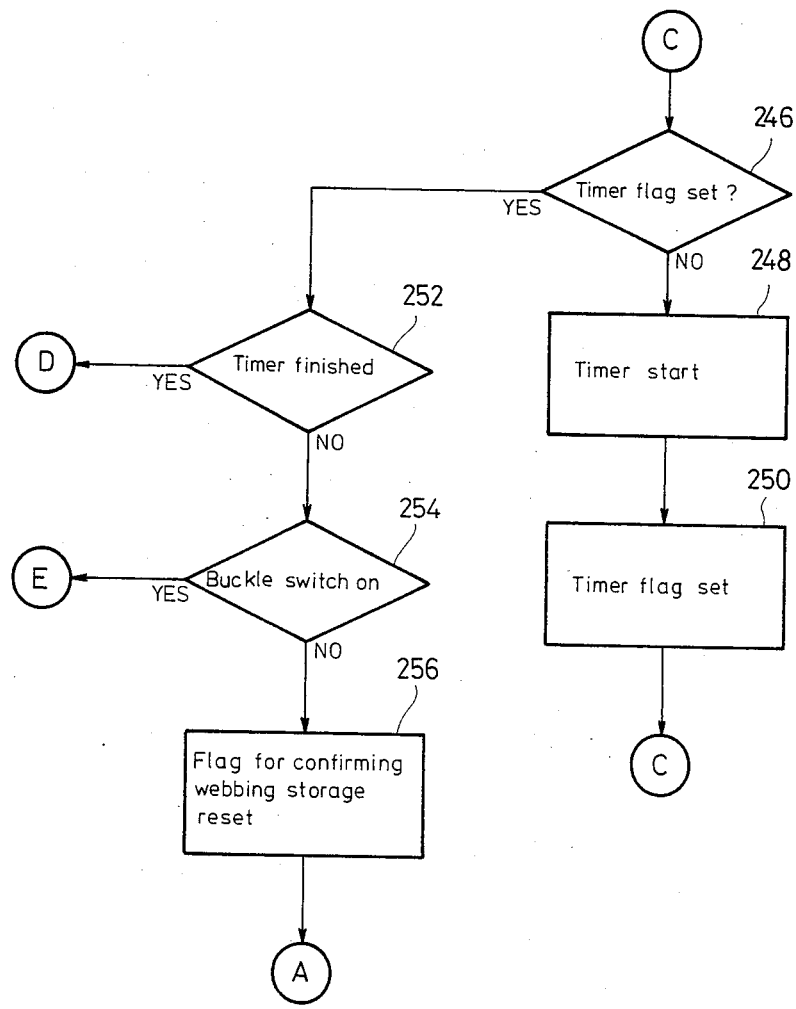

In a first step 200 shown in FIG. 6 the output voltage of the buckle switch 76 is detected so that it is judged whether or not the webbing 22 has been fastened on the occupant. In the step 200 after it is judged that the webbing 22 has been fastened on the occupant, (which can be detected by the fact that the output voltage of the fixed contact 84 is changed to "H" after the output voltage of the fixed contact 86 is changed from "H" to "L"), a timer flag is reset in a step 201 and it is judged in a step 202 whether or not a substraction value obtained by substracting a second detected value KD detected by the variable resistor 62 for detecting a moving amount of the outer end of the spiral spring 32 from a first detected value SD detected by the variable resistor 72 for detecting a moving amount of the inner end of the spiral spring 32 is equal to the predetermined value LA.

In the step 202 when it is judged that the substraction value (SD−KD) is not equal to the predetermined value LA, it is judged in a step 204 whether or not the substraction value (SD−KD) exceeds the value LA. In the step 204 when it is judged that the substraction value (SD−KD) exceeds the value LA, the motor 36 is rotated in the positive direction so that the outer end of the spiral spring 32 is driven in the direction of the webbing unwinding in a step 206. On the other hand, in the step 204 when it is judged that the substraction value (SD−KD) does not exceed the value LA, the motor 36 is rotated in the negative direction so that the outer end of the spiral spring 32 is driven in the direction of the webbing winding in a step 208.

In the step 202 when it is judged that the substraction value (SD−KD ) is equal to the value LA, the rotation of the motor 36 is stopped.

In such a condition that the substraction value (SD−KD) is equal to the value LA, of course, a biasing force of the spiral spring 32 corresponds to the value LA, in which the biasing force of the spiral spring 32 is predetermined to a much smaller value than that of a conventional webbing device.

Thus, as the substracted value (SD−KD) is kept equal to the value LA in accordance with the above steps while the webbing 22 is being worn on the occupant, the tension of the webbing 22 restraining the occupant is kept a very low value.

Accordingly, the webbing 22 does not give the occupant an oppressive feeling. Also, the occupant wearing the webbing 22 can change his attitude easily and he can also move his seat in the front and rear directions of the vehicle easily. Furthermore, the tension of the webbing 22 restraining the occupant is kept a proper value regardless of his body build.

In the above step 200, when it is judged that the webbing 22 is not worn on the occupant, namely, the tongue plate 24 is released from the buckle device 26, (which is detected by the fact that the output voltage of the fixed contact 86 is changed to "H" after the output voltage of the fixed contact 84 is changed from "H" to "L"), it is judged in a step 212 whether or not a storage confirming flag for confirming a full winding of the webbing 22 (a storage of the webbing 22) is set. In the step 212 when it is judged that the storage confirming flag is not set, it is judged in a step 214 whether or not the first detected value KD is equal to a predetermined winding value KA.

In the step 214 when it is judged that the first detected value KD is not equal to the predetermined winding value KA it is judged in a step 216 whether the former exceeds the latter. In the step 216 when it is judged that the first detected value KD exceeds the predetermined winding value KA, the motor 36 is rotated in the negative direction in a step 218 so that the outer end of the spiral spring 32 is driven in the direction of the webbing winding.

On the other hand, in the step 216 when it is judged that the value KD does not exceed the value KA, the motor 36 is rotated in the positive direction in a step 220 so that the outer end of the spiral spring 32 is driven in the direction of the webbing unwinding.

Thus, the outer end of the spiral spring 32 is driven in such a direction that the value KD is equal to the value KA.

In the step 214 when it is judged that the value KD is equal to the value KA, the motor 36 is stopped temporarily in a step 222.

In the condition that the value KD is equal to the value KA the biasing force of the spiral spring 32 is made very large, whereby the webbing 22 is wound on the takeup shaft 20 rapidly.

Next, after the webbing 22 is wound on the takeup shaft 20 completely, i.e., is stored in the webbing retractor 10, the spiral spring 32 is set to an initial situation as follows:

In a step 224 it is judged whether or not the first detected value SD is equal to a predetermined storage value SK. In the step 224 when it is judged that the former is not equal to the latter, it is judged in a step 226 whether or not the value SD exceeds the value SK.

In the step 226 when it is judged that the value SD exceeds the value SK, the motor 36 is rotated in the negative direction in a step 228 so that the outer end of the spiral spring 32 is driven in the direction of the webbing winding.

On the other hand, in the step 226 when it is judged that the value SD does not exceed the value SK, the motor 36 is rotated in the positive direction in a step 230 so that the outer end of the spiral spring 32 is driven in the direction of the webbing unwinding.

Thus, the webbing 22 is driven through the spiral spring 32 in such a direction that the value SD corresponds to the value SK.

In the above step 224 when it is judged that the value SD is equal to the value SK, the motor 36 is stopped in a step 232 and it is judged in a step 234 whether or not the second detected value KD is equal to the predetermined aimed storage value SK. In this connection, the webbing 22 is put in an initial storage situation, i.e., it is wound on the takeup shaft 22 completely, in the condition that the value SD is equal to the value SK.

In the step 234 when it is judged that the value KD is not equal to the value SK, it is judged in a step 236 whether or not the value KD exceeds the value SK. In the step 236 when it is judged that the former exceeds the latter, the motor 36 is rotated in the negative direction in a step 238 so that the outer end of the spiral spring 32 is driven in the direction of the webbing winding.

On the other hand, in the step 236 when it is judged that the former does not exceed the latter, the motor 36 is rotated in the positive direction in a step 240 so that the outer end of the spiral spring 32 is driven in the direction of the webbing unwinding.

Thus, the outer end of the spiral spring 32 is driven in such a direction that the value KD corresponds to the value SK.

In the above step 234 when it is judged that the value KD is equal to the value SK, the motor 36 is stopped in a step 242. In such a condition that the former is equal to the latter the biasing force of the spiral spring 32 is almost zero. Accordingly, after the webbing 22 is completely wound on the takeup shaft 20, the biasing force of the spiral spring 32 is made almost zero in accordance with the above steps 234, 236, 238 and 240.

Thus, when the tongue plate 24 is released from the buckle device 26, the webbing 22 is rapidly wound on the takeup shaft 20 up to a predetermined position by the large biasing force of the spiral spring 32 so that the webbing 22 is completely stored in the webbing retractor 10, in which the tension of the webbing 22 is almost zero.

Furthermore, after the webbing 22 is stored completely in the webbing retractor 10 in the above manner, the storage confirming flag is set in a step 244.

In the embodiment, steps for preventing an incomplete storage of the webbing 22 progresses as follows:

In the steps 212 when it is judged that the storage confirming flag is set, it is judged in a step 246 whether or not the timer flag is set. When it is judged in the step 246 that the timer flag is not set, a timer for ten seconds starts in a step 248 and the timer flag is set in the step 250.

In the step 246 when it is judged that the timer flag is set, it is judged in a step 252 whether or not the timer is finished. In the step 252 when it is judged that the timer is not finished, it is judged in a step 254 whether or not the buckle switch 26 is switched on. In the step 254 when it is judged that the buckle switch 26 is not switched on, the storage confirming flag is reset in a step 256 and the step 256 is returned back to the step 212, so that the steps for storing the webbing 22 in the webbing retractor 10 starts again. The restoring operation is conducted in about ten seconds from the completion of the storing operation.

When it is judged in the step 252 that the timer is finished, the step 252 is returned back to the start.

When it is judged in the step 254 that the buckle switch is switched on, the step 254 is returned back to the step 202.

As set forth above, in the embodiment the webbing 22 can be unwound by the occupant with a small unwinding force and, therefore, it is easy for the occupant to wear the webbing 22.

Also, even if the occupant changes his attitude or moves his seat after he wears the webbing 22 regardless his body build, the tension of the webbing 22 is kept a proper value by the control of the motor 36, whereby the webbing 22 does not give the occupant an oppressive feeling so that he is not tired.

In addition, when the tongue plate 24 is released from the buckle device 26, the webbing is wound rapidly on the takeup shaft by a large biasing force of the spiral spring so that the webbing 22 can be stored completely in the webbing retractor 10.

Furthermore, when the webbing 22 is unwound from the webbing retractor 10 by mistake after it is once stored therein, the webbing is automatically stored in the webbing retractor 10, again, so that the webbing 22 is prevented from being incompletely stored in the webbing retractor.

In this connection, a switch for setting the confirming flag compulsorily can be provided on the webbing retractor 10, whereby when the webbing 22 is incompletely stored in the webbing retractor 10 the webbing 22 can be automatically wound in the webbing retractor 10 by the operation of the switch without unwinding the webbing 22, again.

What is claimed is:

1. A webbing retractor adapted for use in a seatbelt system for restraining an occupant of a vehicle by an occupant restraining webbing, which comprises:
   (a) a resilient member, one end thereof being secured to a webbing takeup shaft secured with one end of the webbing, for biasing the takeup shaft in a direction of webbing winding;
   (b) an actuator for moving the other end of the resilient member in the direction of webbing winding or in the direction of webbing unwinding;
   (c) a first moving amount detector for detecting a moving amount of the one end of the resilient member;
   (d) a second moving amount detector for detecting a moving amount of the other end of the resilient member; and
   (e) drive control means connected to the actuator, for controlling the actuator to move the other end of the resilient member in the direction of webbing winding or webbing unwinding in response to a first detected value detected by the first moving amount detector and a second detected value detected by the second moving amount detector, whereby a tension of the webbing can be made proper when the occupant wears the webbing.

2. A webbing retractor as set forth in claim 1, wherein the first moving amount detector is a first variable resistor having a shaft connected to the takeup shaft to be rotated therewith so that a resistance value of the first variable resistor is changed and the change of the resistance value is transmitted to the drive control means as a first signal.

3. A webbing retractor as set forth in claim 2, wherein the second moving amount detector is a second variable resistor having a shaft connected to the other end of the resilient member to be rotated therewith so that a resistance value of the variable resistor is changed and the change of the resistance value is transmitted to the drive control means as a second signal.

4. A webbing retractor as set forth in claim 3, wherein the actuator comprises a motor and a case for covering the resilient member rotatably supported on the takeup shaft and secured with the other end of the resilient member, a rotation of the motor being transmitted to the case through a worm gear so that the other end of the resilient member is moved in the directions of webbing winding and webbing unwinding.

5. A webbing retractor as set forth in claim 4, wherein the shaft of the first variable resistor is fixed at its distal end portion with a first gear wheel which is engaged with a second gear wheel fixed to a distal end portion of the takeup shaft coaxially therewith, whereby the shaft of the first variable resistor is rotated in accordance with the rotation of the takeup shaft.

6. A webbing retractor as set forth in claim 5, wherein the shaft of the second variable resistor is fixed at its distal end portion with a third gear wheel which is engaged with a fourth gear wheel provided on an outer periphery of the case, whereby the shaft of the second variable resistor is rotated in accordance with the rotation of the case.

7. A webbing retractor as set forth in claim 6, wherein the drive control means comprises a microcomputer receiving the first signal and the second signal and circuit means receiving a third signal in response to the first and second signal from the microcomputer to rotate the motor in the direction of webbing winding or unwinding, whereby when the occupant is restrained by the webbing the tension of the webbing can be kept low so that the occupant can be put in a comfortable situation and when the webbing is stored completely in the webbing retractor the tension of the webbing can be made substantially zero so that the webbing can be unwound from the webbing retractor with a small unwinding force of the occupant.

8. A webbing retractor as set forth in claim 7, which further comprises a buckle switch outputting a fourth signal to the microcomputer in accordance with a latching operation of a tongue plate secured to the other end of the webbing to a buckle device mounted on a vehicle body, the microcomputer controlling the motor to rotate the other end of the resilient means through the circuit means in the direction of webbing unwinding when the tongue plate is released from the buckle device, whereby the biasing force of the resilient means is strengthened so that the webbing is wound in the webbing retractor rapidly.

9. A webbing retractor as set forth in claim 8, which further comprises an inertia locking mechanism for preventing the takeup shaft from rotation in the direction of the webbing unwinding when the vehicle is in an emergency situation.

10. A webbing retractor adapted for use in a seatbelt system for restraining an occupant of a vehicle by an occupant restraining webbing, which comprises:
   (a) a spiral spring, an inner end thereof being secured to a webbing takeup shaft secured with one end of the webbing, for biasing the takeup shaft in a direction of a webbing winding;
   (b) a case for covering the spiral spring, supported rotatably on the takeup shaft and secured with an outer end of the spiral spring;

(c) a motor connected to the case, for rotating the case in the direction of webbing winding or in a direction of webbing unwinding;

(d) a first moving amount detector for detecting a moving amount of the inner end of the spiral spring;

(e) a second moving amount detector for detecting a moving amount of the outer end of the spiral spring; and (f) a drive control unit connected to the motor, for controlling the motor to move the outer end of the spiral spring in the directions of webbing winding or webbing unwinding in response to a first output signal of the first moving amount detector and a second output signal of the second moving amount detector, whereby a tension of the webbing can be made proper when the occupant wears the webbing.

11. A webbing retractor as set forth in claim 10, wherein the first moving amount detector is a first variable resistor having a shaft connected to the takeup shaft to be rotated therewith so that a resistance value of the first variable resistor is changed and the change of the resistance value is outputted to the drive control unit as the first output signal.

12. A webbing retractor as set forth in claim 11, wherein the second moving amount detector is a second variable resistor having a shaft connected to the cover to be rotated in accordance with a rotation of the cover so that a resistance value of the variable resistor is changed and the change of the resistance value is outputted to the drive control unit as the second output signal.

13. A webbing retractor as set forth in claim 12, wherein the shaft of the first variable resistor is fixed at its distal end, coaxially with the case, with a first gear wheel which is engaged with a second gear wheel fixed to a distal end of the takeup shaft, whereby a rotation of the takeup shaft is transmitted to the first variable resistor.

14. A webbing retractor as set forth in claim 13, wherein the shaft of the second variable resistor is fixed at its distal end with a third gear wheel which is engaged with a fourth gear wheel provided on an outer periphery of the case, whereby a rotation of the case is transmitted to the shaft of the second variable resistor.

15. A webbing retractor as set forth in claim 14, wherein the motor is connected at its drive shaft to a worm engaged with a worm wheel provided on an outer periphery of the case, whereby a rotation of the drive shaft of the motor is transmitted to the case so that the outer end of the spiral spring is moved in the direction of webbing winding or webbing unwinding.

16. A webbing retractor as set forth in claim 15, wherein the drive control unit comprises a microcomputer receiving the first output signal and the second output signal and circuit means receiving a third output signal outputted from the microcomputer in response to the first and the second output signals to rotate the drive shaft of the motor in the direction of webbing winding or webbing unwinding, whereby when the occupant is restrained by the webbing the tension of the webbing can be kept low so that the occupant can be put in a comfortable situation, and when the webbing is stored completely in the webbing retractor the tension of the webbing can be made substantially zero so that the webbing can be unwound from the webbing retractor with a small unwinding force of the occupant.

17. A webbing retractor as set forth in claim 16, which further comprises a buckle switch outputting a fourth output signal to the microcomputer in accordance with a latching operation of a tongue plate secured to the other end of the webbing to a buckle device mounted on a vehicle body, the microcomputer controlling the drive shaft of the motor to rotate the case through the circuit means in the direction of webbing winding when the tongue plate is released from the buckle device, whereby the biasing force of the spiral spring is strengthened so that the webbing is wound in the webbing retractor rapidly.

18. A webbing retractor as set forth in claim 17, which further comprises an inertia locking mechanism for preventing the takeup shaft from rotation in the direction of webbing unwinding when the vehicle is in an emergency situation.

19. A webbing retractor retracting an occupant restraining webbing therein, adapted for use in a seatbelt system for restraining an occupant of a vehicle by the webbing, which comprises:

(a) a frame fixed to a vehicle body;

(b) a webbing takeup shaft rotatably supported at both its end portions to the frame for winding the webbing thereon;

(c) a spiral spring, an inner end thereof being secured to the takeup shaft, for biasing the takeup shaft in a direction of webbing winding;

(d) a case for covering the spiral spring, supported rotatably to the takeup shaft and secured with an outer end of the spiral spring;

(e) a motor connected to the case, for rotating the case in the direction of webbing winding or in a direction of webbing unwinding;

(f) a first variable resistor having a shaft connected to the takeup shaft to be rotated therewith for outputting a first signal showing a change of a resistance value of the first variable resistor due to the rotation of the second variable resistor;

(g) a second variable resistor having a shaft connected to the cover to be rotated in accordance with a rotation thereof, for outputting a second signal showing a change of a resistance value of the second variable resistor due to the rotation of the first variable resistor; and (f) a drive control unit connected to the motor, for controlling the motor to move the case in the direction of webbing winding or webbing unwinding in response to the first signal and the second signal, whereby a tension of the webbing can be made proper when the occupant wears the webbing.

20. A webbing retractor as set forth in claim 19, which further comprises an inertial locking mechanism for preventing the takeup shaft from rotation in the direction of webbing unwinding when the vehicle is in an emergency situation.

* * * * *